March 4, 1941.  F. J. MAYWALD, JR  2,233,543
MACHINE FOR BEADING DIPPED RUBBER ARTICLES
Filed Oct. 20, 1939  5 Sheets-Sheet 2
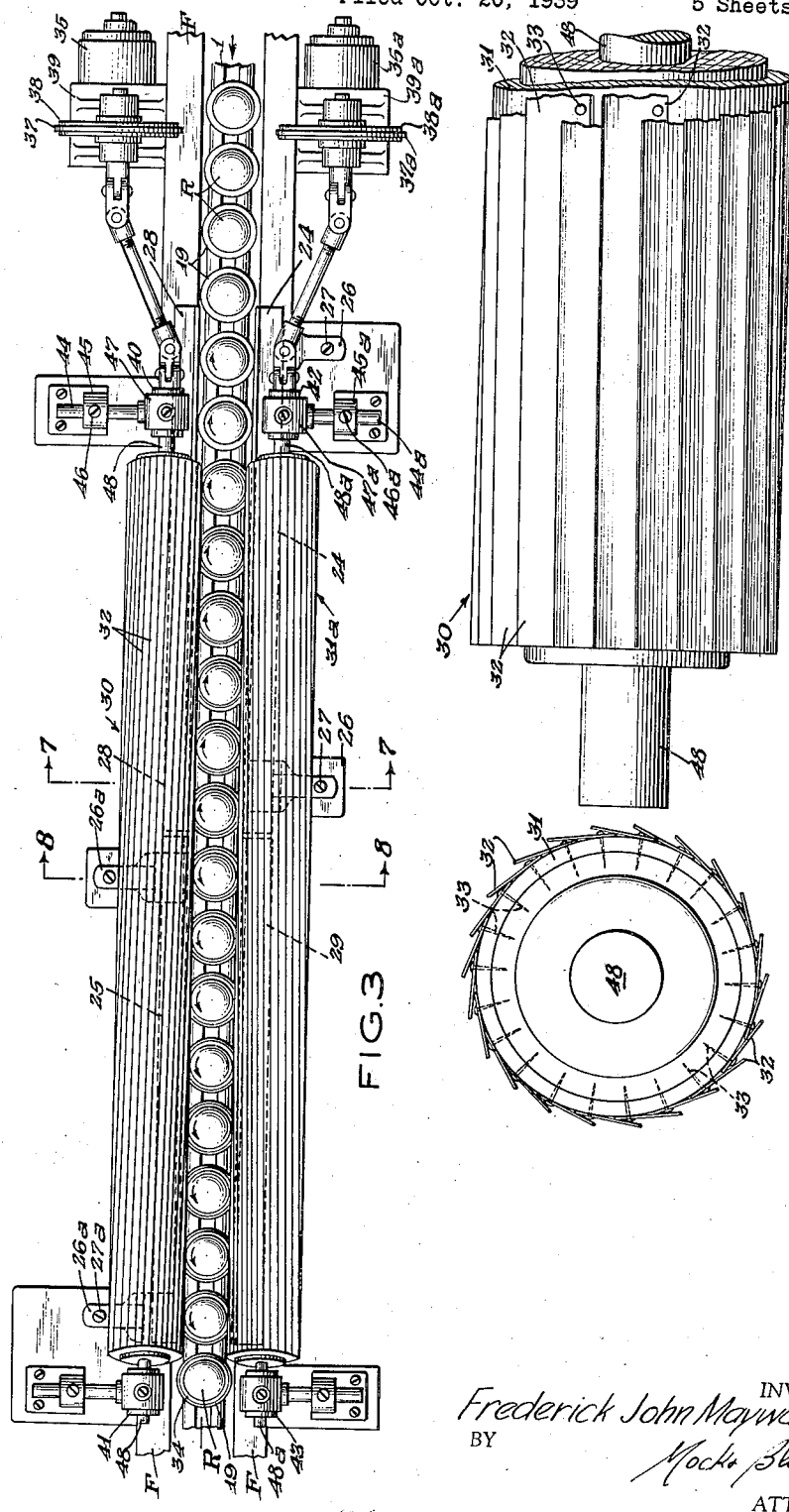
INVENTOR.
Frederick John Maywald Jr.
BY
ATTORNEYS March 4, 1941.  F. J. MAYWALD, JR  2,233,543
MACHINE FOR BEADING DIPPED RUBBER ARTICLES
Filed Oct. 20, 1939  5 Sheets-Sheet 3

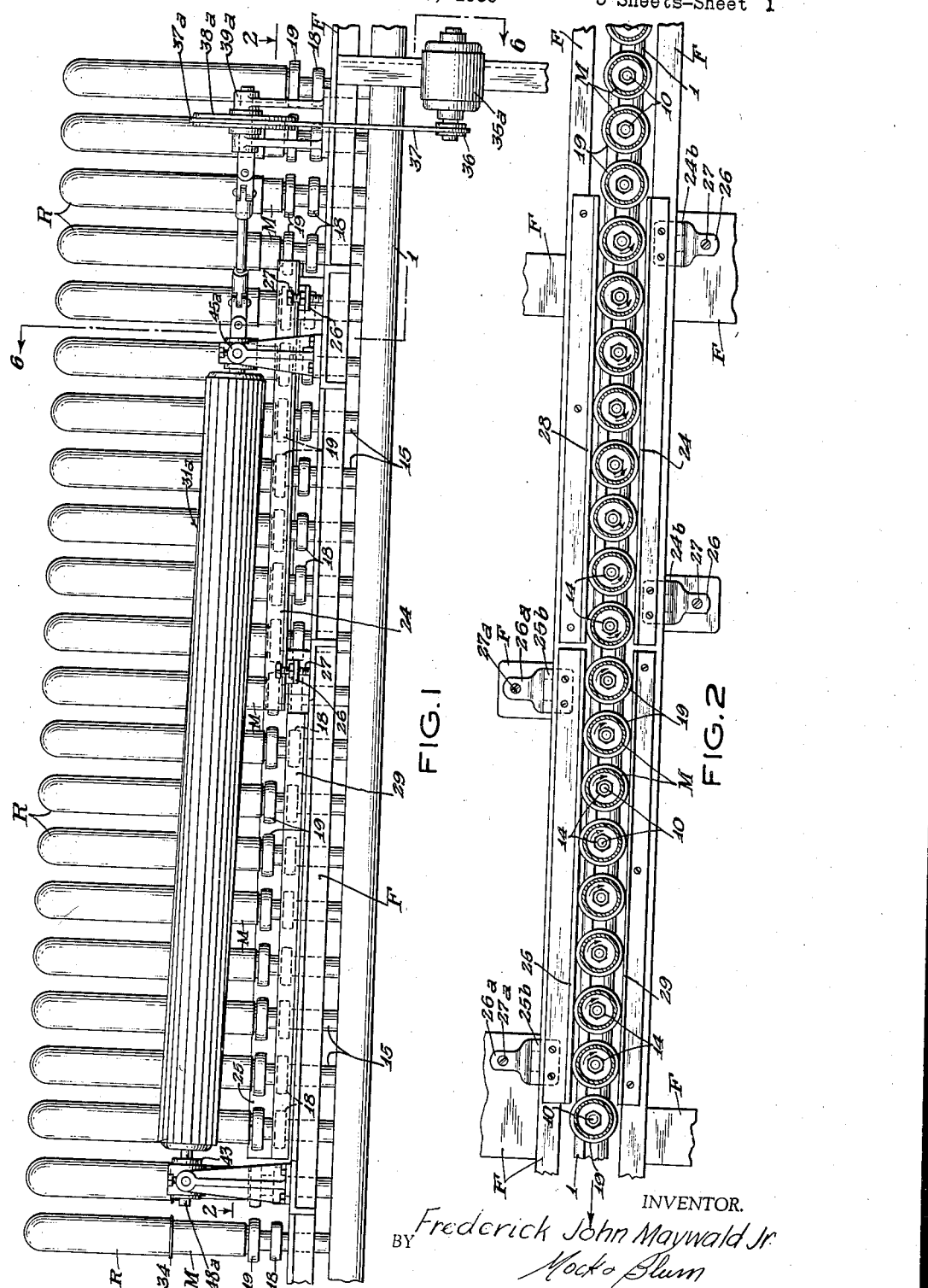

INVENTOR.
Frederick John Maywald Jr
BY
Mock & Blum
ATTORNEYS

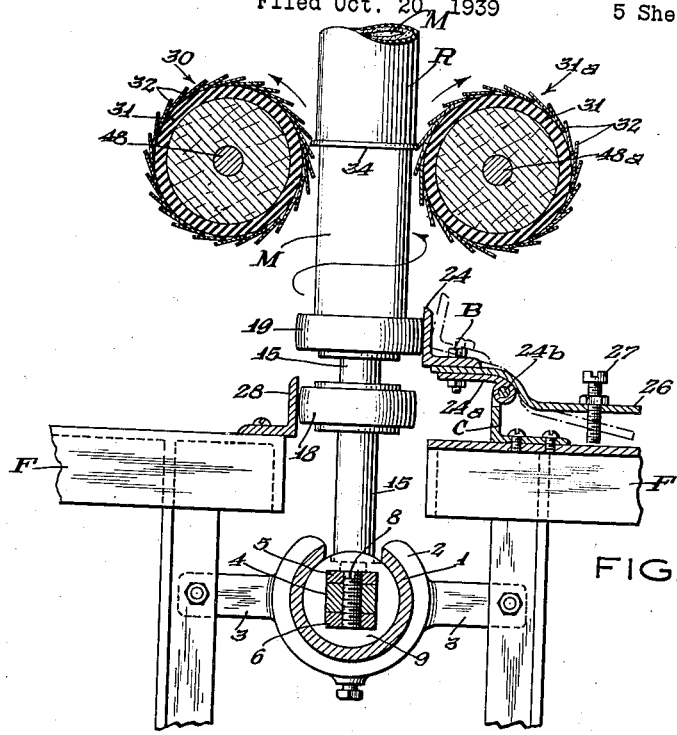
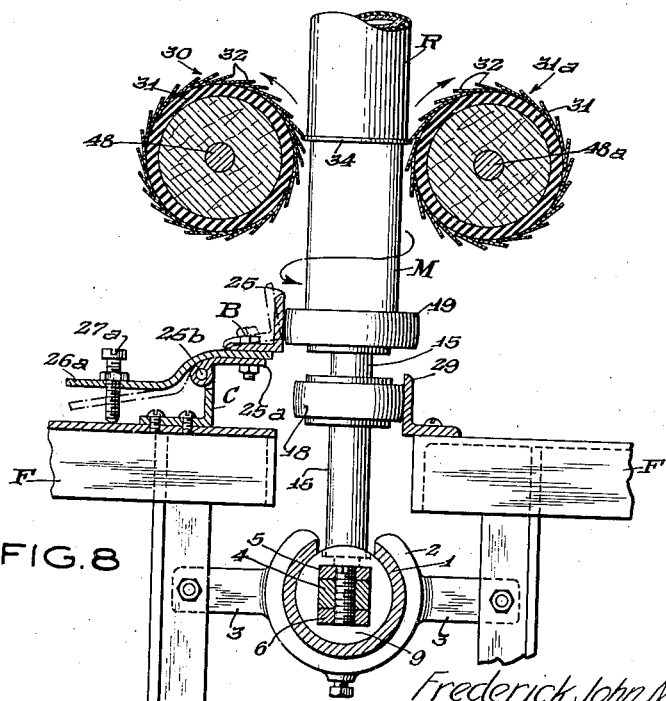

March 4, 1941.　　　F. J. MAYWALD, JR　　　2,233,543
MACHINE FOR BEADING DIPPED RUBBER ARTICLES
Filed Oct. 20, 1939　　　5 Sheets-Sheet 5
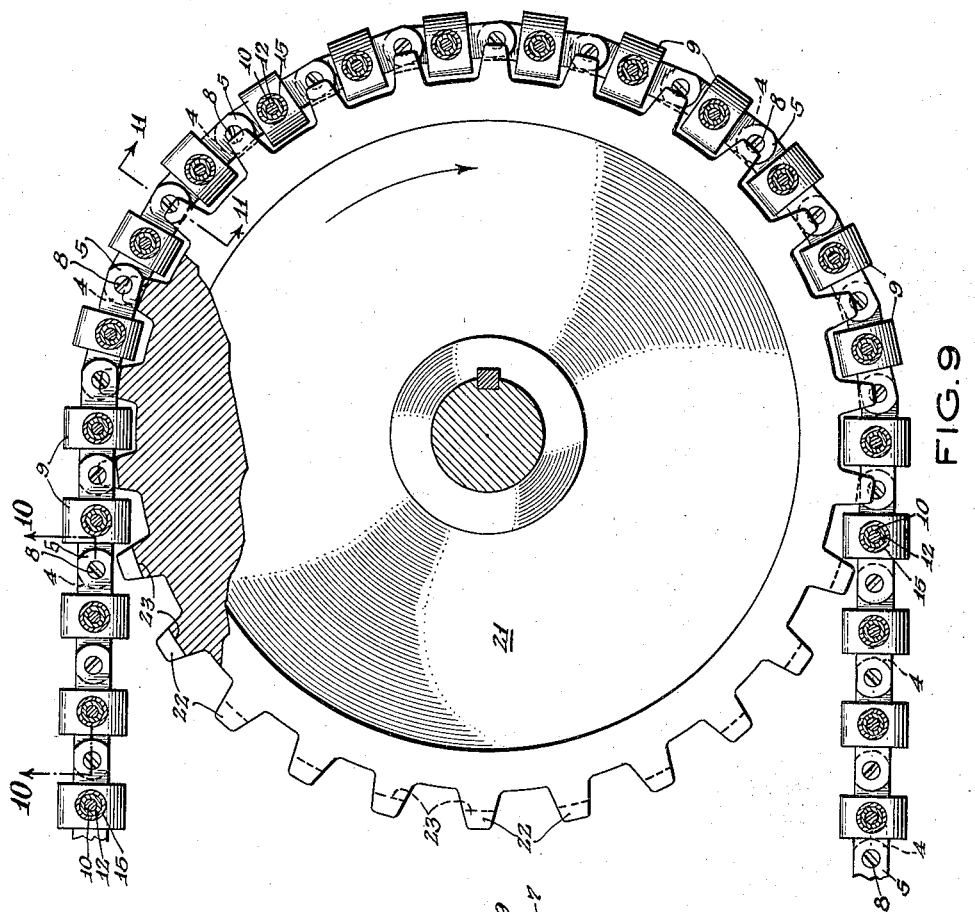
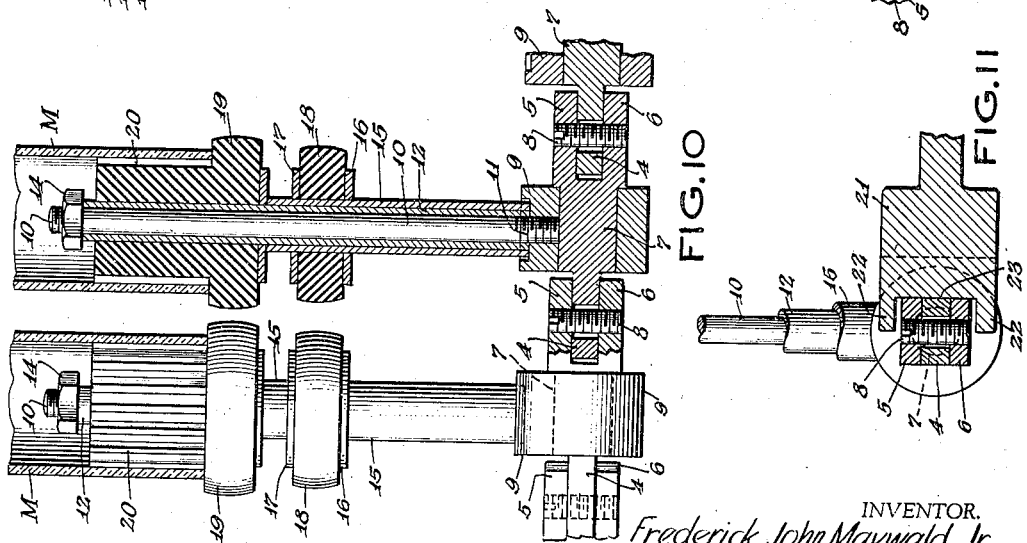
INVENTOR.
Frederick John Maywald, Jr.
BY
Mock, Blum
ATTORNEYS Patented Mar. 4, 1941

2,233,543

UNITED STATES PATENT OFFICE 2,233,543

MACHINE FOR BEADING DIPPED RUBBER ARTICLES

Frederick John Maywald, Jr., Rutherford, N. J., assignor, by mesne assignments, to Frank B. Killian & Company, Akron, Ohio, a partnership composed of James Tyrrell, trustee, Perry H. Stevens, Lucy S. Stevens, and Maurice Gusman, all of Akron, Ohio Application October 20, 1939, Serial No. 300,324

12 Claims. (Cl. 18—2)

My invention relates to a new and improved machine for beading dipped rubber articles, such as finger-cots, toy balloons and the like.

One of the objects of the invention is to provide an improved automatic machine whereby a series of mandrels or forms can be dipped into a body of latex or like material, so as to form films of rubber on said forms, and in which the dipped rubber films are then dried and beaded so as to reinforce the open ends of the objects.

Another object of the invention is to provide an improved endless conveyor for the forms, whereby the forms can be freely turned relative to said conveyor, without injuring the conveyor.

Another object of the invention is to provide an improved beading mechanism.

Other objects of the invention will be stated in the annexed description and drawings which illustrate a preferred embodiment of the improved machine.

Fig. 1 is a partial side elevation of the improved machine, showing the mechanism for beading the rubber articles.

Fig. 2 is a sectional view on the line 2—2 of Fig. 1.

Fig. 3 is a top plan view of Fig. 1.

Fig. 4 is a partial end elevation of one of the rotatable beading elements.

Fig. 5 is an end elevation, taken at the left-hand side of Fig. 4.

Figure 6:
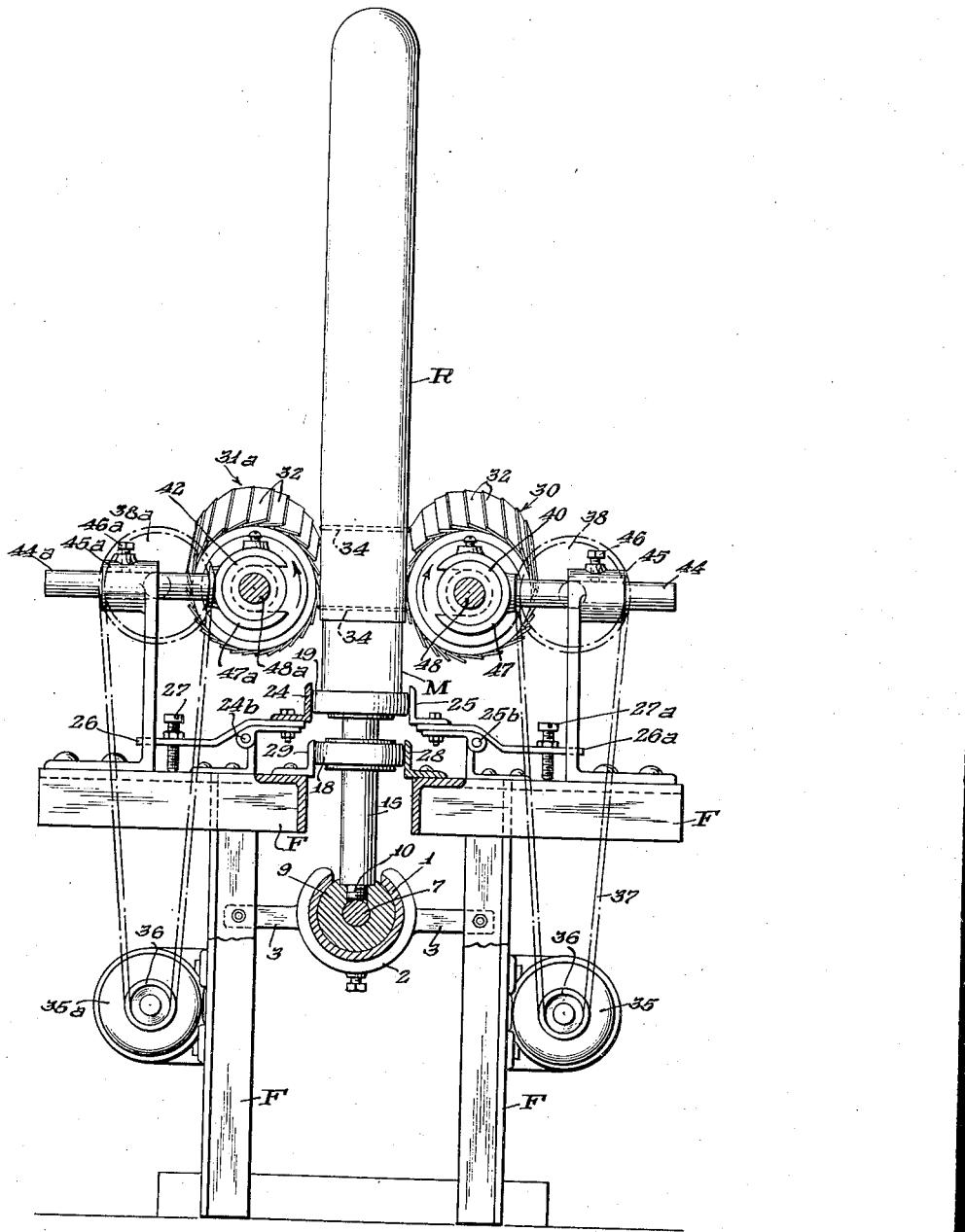
Fig. 6 is a sectional view, partially in elevation, on the line 6—6 of Fig. 1.

Figs. 7 and 8 are respectively sectional views, partially in elevation, on the lines 7—7 and 8—8 of Fig. 3.

Fig. 9 is an enlarged detail plan view of a portion of the endless conveyor, and one of the sprockets by means of which the endless conveyor is supported.

Figs. 10 and 11 are respectively sectional views on the lines 10—10 and 11—11 of Fig. 9.

The machine comprises a longitudinally slotted tube 1, mounted in a slotted sleeve 2 which is connected by means of arms 3 to the frame F. The tube 1 is held stationary.

As shown in Figs. 9 and 10, the conveyor comprises a series of links, which are pivotally connected to each other. Each link has a shank-portion 7 which is of cylindrical contour. Each shank-portion 7 is integral at one end thereof with a forked head which has arms 5 and 6. At its other end, each shank-portion 7 has an extension 4. Each extension 4 is provided with a lateral bore, which is located between the arms 5 and 6 of the adjacent link. Pivotal connection is provided between the respective links by means of pivot screws 8 which pass with a clearance through the bores of the shank-portions 4. The arms 5 and 6 have corresponding tapped bores, to which the pivot screws 8 are connected. Collars 9 are freely turnable on the cylindrical shank-portions 7. Each collar 9 is located between a pair of forked heads of adjacent links. As shown in Fig. 9, each link has a first shoulder at the junction of shank-portion 7, and the arms 5 and 6. The link has a second shoulder at the junction of members 7 and 4. The clearance between said second shoulder and the adjacent ends of members 5 and 6 may be very small, so that the first shoulder and the end-walls of arms 5 and 6 prevent any substantial longitudinal movement of collars 9 relative to the conveyor. Pins 10 have threaded ends 11, which are screwed into tapped bores of the respective collar 9. An inner tube 12 fits closely but turnably on each pin 10. The inner end of each inner tube 12 is located in a countersunk recess of the respective collar 9. Each inner tube 12 is freely turnable relative to its respective pin 10.

A nut 14 is mounted on the outer threaded end of each pin 10, thus maintaining the pin 10 and its inner tube 12 assembled with each other, while permitting tube 12 to turn. An outer tube 15 fits turnably on each inner tube 12. Each outer tube 15 is provided with spaced washers 16 and 17 which are suitably connected to said tube 15, either by a drive fit or by other suitable means, so that the washers 16 and 17 turn in unison with the outer tube 15, relative to the longitudinal axis of the respective pin 10.

A first or inner roll 18 is clamped between each pair of washers 16 and 17, so that the roll 18 turns in unison with the respective outer tube 15. The first or inner roll 18 may have an outer surface of hard but resilient vulcanized rubber or other suitable material, which has a high co-efficient of friction. A second or outer roll 18' which is also preferably made of hard but resilient vulcanized rubber, is cemented or otherwise suitably connected to each inner tube 12, above the respective first roll 18. Each second roll 19 therefore turns in unison with the respective inner tube 12, and the rolls 18 and 19 can be turned freely relative to each other. Each roll 19 has a ribbed head 20 which is made of resilient vulcanized rubber, so that the form or mandrel M can be frictionally forced over and held frictionally by ribbed head 20. Each mandrel M therefore turns in unison with the respective second or outer roll 19.

The conveyor meshes with two or more sprockets 21. Each of these sprockets 21 is provided with teeth 22, which are U-shaped in cross-section, as shown in Fig. 11. In effect each tooth 22 has a pair of arms or members which are separated by an intermediate recess. The bases of these recesses are indicated by the respective broken lines 23 in Fig. 9.

As shown in Fig. 9, the collars 9 intermesh with the gear 21, between the teeth 22, and the forked heads of the links are then located between the arms of teeth 22 and said heads then rest upon the bottom walls 23 of the respective recesses of said teeth. The conveyor is thus supported upon a suitable number of sprockets 21, one of which is positively driven so as to actuate the conveyor. The collars 9 are freely turnable relative to the longitudinal axes of the respective links, and each mandrel is freely turnable about an axis which is perpendicular to the longitudinal axis of the respective link.

As shown in Figs. 3, 7 and 8, the frame of the machine is provided with rails 24 and 25. As shown in Figs. 2 and 3, these rails are located on opposite sides of the conveyor and they are arranged longitudinally in staggered relation, so that the rear end of the rail 24 is opposite the front end of the rail 25. The arrow in Fig. 2 indicates the direction in which the straight top run of the endless conveyor moves, together with the mandrels M. These rails 24 and 25 are mounted so as to contact frictionally with the outer rolls 19, and said rails 24 and 25 therefore respectively cause the mandrel M to turn in opposite directions, as indicated by the curved arrows in Figs. 2 and 3.

Therefore, during the beading operation, each mandrel is mounted vertically and it is turned about its longitudinal axes through one or more revolutions in one direction and it is then turned through the same number of revolutions in the opposite direction. It is preferred to cause each mandrel to turn more than two complete revolutions, first in one direction and then in the opposide direction. The rails 24 and 25 may be designated as outer rails.

The rail 24 is connected by means of bolts B to an arm 26 and also to a pivoted member 24a, which is pivotally connected at 24b to a bracket C. Said bracket is suitably connected to the frame of the machine. The arm 26 is provided with an adjusting screw 27, whereby the position of the rail 24 relative to the rolls 19 can be adjusted so as to cause contact between rolls 19 and rail 24 under sufficient pressure. The rail 25 is similarly adjustably mounted, so that members 25a 26a, 25b and 27a respectively correspond to members 24a, 26, 24b and 27. Lower or inner rails 28 and 29 contact with the lower or inner rolls 18 of the respective mandrels. Said rails 28 and 29 are fixed to the frame F. The rail 28 is opposed to the rail 24. Said rails 24 and 28 are of the same length and their respective ends are laterally opposite each other. The same relation exists between the rails 25 and 29.

Beading rolls 30 and 31a are provided at opposite sides of the mandrels, at the straight top run of the conveyor. These beading rolls 30 and 31a are of identical construction. Each of these rolls comprises a core which is made of wood or other rigid material, and an outer sleeve 31, which is made of resilient vulcanized rubber. Strips 32, which are made of rawhide or other suitable flexible or resilient material are connected in overlapping relation to the respective rolls 30 and 31a, as shown for example in Figs. 5, 4 and 7.

As shown in Fig. 5, the respective strips 32 are connected to the core of the respective roll, by means of nails 33 or the like. These nails 33 pass through the rubber sleeve 31. The head of each nail is covered by an adjacent strip 32 as shown in Fig. 5. The strips 32 are preferably of uniform width and of rectangular shape. However the long edges and the longitudinal axes of these strips 32, instead of being parallel to the longitudinal axis of the respective beading roll, are inclined to said longitudinal axis of the beading roll. This is shown for example in Fig. 3. This inclination may be relatively slight, as for example, about 3°.

As shown for example in Fig. 7, the rolls 30 and 31a are turned in opposite directions so that the free ends of the rubber strips or blades 32 contact with the inner edge of the rubber film R, thus forming a bead 34. Each mandrel is turned through at least one revolution, during the beading operation, and each mandrel is preferably turned through two or more revolutions, first in one direction, and then in the opposite direction, during the beading operation.

As shown for example in Fig. 1, the longitudinal axis of each beading roll is inclined to the horizontal plane. The longitudinal axes of the mandrels are maintained vertical during the beading operation. The bottom edge of the rubber film R is therefore wiped upwardly during the beading operation.

As shown for example in Figs. 3 and 6, the respective beading rolls 30 and 31a are driven by respective motors 35 and 35a. These drives are identical.

As shown in Fig. 6, the shaft of the motor 35 has a pulley 36, which is connected by a belt 37 to a pulley 38. As shown in Fig. 3, the pulley 38 is mounted upon a bracket 39 which is suitably connected to the frame F. The shaft of the pulley 38 is connected by means of an ordinary universal joint to the shaft of the beading roll 30. The shaft-extensions 48 of the beading roll 39 are mounted in bearings 40 and 41, and the shaft-extensions 48a of the beading roll 31a are mounted in bearings 42 and 43. These bearings are mounted on brackets which are suitably connected to the frame of the machine. These bearings can be adjusted towards and away from each other by conventional means. For this purpose the bearing 40, for example, is mounted in a bushing 47 which is provided with a rod 44 which is slidable in a collar 45. After the rod 44 has been adjusted in the collar 45, said rod 44 is fixed to the fixed collar 45 by means of a set-screw 46. The bearing 42 is mounted in bushing 47a, whose rod 44a is adjustably connected in fixed collar 45a by set-screw 46a. Hence bearings 40 and 42 can be adjusted towards and away from each other, and bearings 41 and 43 can also be adjusted in this manner, until blades 32 make suitable beading contact with the latex film R.

The rails 28 and 29 merely maintain the mandrels M upright during the beading operation because the rolls 18 are freely turnable relative to the mandrels. The rails 28 and 29 and the rolls 18 therefore maintain the axes of the mandrels parallel to a predetermined line, during the beading operation.

It has heretofore been proposed to bead a rubber object of the type described, by means of rolls located at the opposite sides of the mandrels, as for example in Hadfield, U. S. Patent No. 1,097,017. However the resilient and yielding and flexible strips of rawhide 32 or of equivalent material, provide a superior beading action. These strips 32 are sufficiently resilient to have the normal shape shown in Fig. 5, and they are bent out of said normal shape when they contact with the surface of the mandrel to perform the beading operation.

During the beading operation, the links of the conveyor are located in and they move relative to the rigid and stationary and straight tube 1. This tube is slotted so that the tubes 15 and the parts which are located inwardly of said tubes, can project out of said tube 1. The tubes 15 have substantial clearance relative to the edges of the slot of the guide tube 1. The conveyor may have a suitable sliding fit within the guide tube 1, in order to permit the movement of the conveyor relative to the guide tube 1, with little or no friction.

The mandrels are preferably turned equally as well as in opposite directions during the beading operation. During said beading operation each mandrel is preferably turned 3 revolutions, first in one direction and then in the other. The successive turning of the mandrels in opposite directions produces a more uniform bead.

During the beading operation the free edges of the strips 32 may rub against the wall of the mandrel M, which is made of glass or other smooth material. If desired, the shaft-extensions 43 and 48a can be adjusted so that the free edges of the blades 32 merely contact with the rubber film R, and without contacting with the cylindrical wall of the mandrel M.

Since the conveyor is constructed so that each mandrel is freely turnable relative to the straight longitudinal axis of the run of the conveyor, in which the beading operation is performed, this facilitates the cooperation of the inner rolls 18 with the inner rails 28 and 29.

The invention is not limited to a machine in which the longitudinal axes of the mandrels are held vertical during the beading operation.

Whenever rubber is referred to in the claims, it is to be understood that the film can be made of any stretchable material which can be wiped so as to provide a beaded edge at the open end of said film.

I claim:

1. Beading mechanism comprising a conveyor, said conveyor having links which are connected to each other by pivot members, said links having collars turnably mounted thereon, each said link having a straight longitudinal axis, each collar being turnable relative to the respective link around the longitudinal axis thereof, each collar being located between a pair of said pivot members, said conveyor having means adapted to hold the collars against substantial longitudinal movement relative to the conveyor, each collar having a pin fixed thereto, the longitudinal axis of each pin being perpendicular to the longitudinal axis of the respective link, a first tube turnably mounted on each pin, a second tube turnably mounted on each first tube, each first tube having a mandrel and a first roll connected thereto so that each first tube can turn in unison with the respective mandrel and the respective first roll around the longitudinal axis of the respective pin, each second tube having a second roll connected thereto and turnable in unison therewith, said machine having a first pair of rails which are mounted to contact with the first rolls, said first rails being longitudinally offset so that they contact in succession with the first rolls, each first rail having a companion rail which contacts with the respective second rolls, each said first rail and its companion rail being located on opposite sides of the mandrels, means adapted to bead rubber films which are located on said mandrels while said rolls contact with the aforesaid rails.

2. Beading mechanism comprising a conveyor, mandrel-supports connected to said conveyor, mandrels turnably mounted on said mandrel-supports so that the mandrels can be turned around their respective longitudinal axes, means adapted to maintain the longitudinal axes of the mandrels parallel to a predetermined straight line and also to turn the mandrels around their longitudinal axes, beading rolls between which the mandrels are moved, each beading roll having an axis which make an angle other than 90 degrees with said predetermined straight line, means adapted to turn said beading rolls in opposite directions, each beading roll having beading strips connected to its periphery, said beading strips overlapping each other and having free edges, the beading rolls being mounted so that said free edges can wipe rubber films which are located on the respective mandrels.

3. A device according to claim 2 in which the beading strips have free edges which are inclined to the longitudinal axes of the respective rolls.

4. Apparatus of the class described comprising and endless conveyor including cylindrical members, a fixed, tube-like member embracing said conveyor and constituting a slide therefor, said member having a longitudinally extending radial opening, the transverse curvature of said member being sufficient to maintain said cylindrical members therewithin, rods attached to and projecting from said cylindrical members through said radial opening, a plurality of independently rotatable rollers on each rod, dipping forms attached to certain of the rollers on each rod, and a fixed rail along said radial opening and engaging with the other rollers on said rods.

5. Apparatus of the class described comprising an endless conveyor including cylindrical members, a fixed tube-like member embracing said conveyor and constituting a slide therefor, said member having a longitudinally extending radial opening, the transverse curvature of said member being sufficient to maintain said cylindrical members therewithin, rods attached to and projecting from said cylindrical members through said radial opening, form assemblies rotatably mounted on said rods, each said assembly including rollers spaced axially along said rod, one of said rollers including a tubular extension, and a tubular form attached to and rotatable with said extension, and a fixed rail along said radial opening and engaging with the form carrying rollers.

6. Apparatus of the class described comprising a form conveyor, hinged form mountings carried on said conveyor, forms carried on said mountings, and tracks associated with said conveyor for guiding said mountings, said mountings having thereon idler rollers, rotatable on the mountings freely of the forms and engageable with said tracks to guide said mountings during movement of the conveyor.

7. Apparatus of the class described comprising an endless conveyor including cylindrical members, a fixed, tube-like member embracing said conveyor and constituting a slide therefor, said member having a longitudinally extending radial opening, the transverse curvature of said member being sufficient to maintain said cylindrical members therewithin, rods attached to and projecting from said cylindrical members through said radial opening, a plurality of rollers rotatable on each said rod, forms attached to the rollers which are more remote from said tube-like member, and a fixed rail on one side of said rod and engaging said form carrying rollers.

8. Apparatus of the class described comprising an endless conveyor including cylindrical members, a fixed, tube-like member embracing said conveyor and constituting a slide therefor, said member having a longitudinally extending radial opening, the transverse curvature of said member being sufficient to maintain said cylindrical members therewithin, rods attached to and projecting from said cylindrical members through said radial opening, a plurality of rollers rotatable on each rod, the rollers of the several rods being arranged in sets, dipping forms attached to one set of said rollers, a fixed guide on one side of said rods and engaging said set of rollers, the said second set of rollers being disposed between said first set of rollers and said tube-like member, and another fixed guide on the other side of said rods and engaging the second set of rollers.

9. Apparatus of the class described comprising an endless conveyor including cylindrical members, a fixed, tube-like member embracing said conveyor and constituting a slide therefor, said member having a longitudinally extending radial opening, the transverse curvature of said member being sufficient to maintain said cylindrical members therewithin, rods attached to and projecting from said cylindrical members through said radial opening, a plurality of rotatable rollers on each rod, dipping forms attached to certain of the rollers on each rod, a fixed rail engageable with said form carrying rollers, and movable means engaging said forms for forming strengthening beads on thin rubber articles on said forms.

10. Apparatus of the class described comprising a form conveyor, form mountings carried by said conveyor, said mountings being shiftable about the axis of said conveyor, forms carried on said mountings, tracks associated with said conveyor for guiding said mountings, rollers rotatable on said mountings and engageable with said tracks to guide said mountings during endwise movement of the conveyor, one roller on each mounting being rotatable independently of the form on said mounting.

11. Apparatus of the class described comprising an endless form conveyor, means for guiding said conveyor in its movement therealong, form mountings carried by said conveyor, said mountings being shiftable about the axis of said conveyor to different angularities, inner and outer rollers independently rotatable around each of said mountings, forms connected to the said outer rollers for rotation therewith, rails on opposite sides of said mountings and engageable respectively with said inner and outer sets of rollers, said rails serving to control the angularity of said forms.

12. Apparatus of the class described comprising an endless form conveyor, means for guiding said conveyor in its movement therealong, form mountings carried by said conveyor, said mountings being shiftable about the axis of said conveyor to different angularities, inner and outer rollers independently rotatable around each of said mountings, forms connected to the said outer rollers for rotation therewith, rails on opposite sides of said mountings and engageable respectively with said inner and outer sets of rollers, said rails serving to control the angularity of said forms, one of said rails being adjustable toward and away from the other rail.

FREDERICK JOHN MAYWALD, Jr.